United States Patent [19]

Ueno et al.

[11] 4,397,401
[45] Aug. 9, 1983

[54] EASILY OPENABLE VESSEL CLOSURE AND PROCESS FOR PREPARATION THEREOF

[75] Inventors: Hiroshi Ueno, Yokosuka; Yasunori Miyamatsu, Ayase; Masanori Aizawa; Yasuo Kaga, both of Yokohama; Kazuhisa Ishibashi, Tokyo, all of Japan

[73] Assignee: Toyo Seikan Kaisha Ltd., Tokyo, Japan

[21] Appl. No.: 354,056

[22] Filed: Mar. 2, 1982

[30] Foreign Application Priority Data

| Mar. 2, 1981 [JP] | Japan | 56-28355 |
| Mar. 31, 1981 [JP] | Japan | 56-46207 |
| Apr. 1, 1981 [JP] | Japan | 56-47230 |
| Jun. 10, 1981 [JP] | Japan | 56-84256[U] |
| Feb. 8, 1982 [JP] | Japan | 57-17640 |

[51] Int. Cl.³ .............. B65D 17/50; B65D 41/02
[52] U.S. Cl. .................. 220/260; 220/359; 156/69; 53/477
[58] Field of Search .......... 220/260, 270, 359, 269; 229/7 R, 43; 222/541; 156/69, 293; 53/477, 478

[56] References Cited

U.S. PATENT DOCUMENTS

| 3,731,835 | 5/1973 | Hawkins et al. | 220/260 |
| 3,990,603 | 11/1976 | Brochman | 220/260 |
| 4,108,330 | 8/1978 | Patterson | 220/260 |
| 4,135,637 | 1/1979 | Hannula | 220/260 |
| 4,170,314 | 10/1979 | Weierman et al. | 220/260 |

*Primary Examiner*—George T. Hall
*Attorney, Agent, or Firm*—Sherman & Shalloway

[57] ABSTRACT

Disclosed is an easily openable vessel closure comprising a can end member having a preformed opening, an easily peelable opening piece which is applied to the outer side of the can end member so that the opening piece covers said opening and adheres closely to the peripheral portion of said opening, and a protecting covering layer formed to cover the cut edge of the opening of the can end member, wherein the protecting covering layer is formed of a thermoplastic resin having a heat bondability and the protecting covering layer includes a film layer heat-bonded to the inner and outer peripheral portions of the opening and a projecting cover heat-bonded to the cut edge of the opening integrally with said film layer, and said opening piece is heat-bonded to the can end member through the protecting covering layer located outside the can end member and said protecting covering layer is stuck closely to the cut edge of the opening so that when the opening piece is peeled, the protecting covering layer is left on the side of the can end member.

This vessel closure is excellent in the seal reliability, corrosion resistance, flavor-retaining property and easy openability.

10 Claims, 17 Drawing Figures

EASILY OPENABLE VESSEL CLOSURE AND PROCESS FOR PREPARATION THEREOF

BACKGROUND OF THE INVENTION

(1) Field of the Invention

The present invention relates to an easily openable vessel closure and a process for the preparation thereof. More particularly, the invention relates to an easily openable vessel closure excellent in the seal reliability, corrosion resistance, flavor retaining property and easy openability and a process for the preparation thereof. Especially, the present invention relates to an improvement in a vessel closure comprising a can end member having a preformed opening and a flexible, easily peelable opening piece bonded to the can end member to cover the periphery of the opening.

(2) Description of the Prior Art

As an easily openable closure suitable for a package, such as a can for a drink or beverage, for example, cola, beer or juice, there has widely been used a vessel closure comprising a portion to be opened, which is defined by a weakening line (score line), a rivet formed on this portion to be opened and a pulling tab secured to the rivet, wherein if this tab is pulled, the weakening line is broken and the portion to be opened is separated.

This score line breaking type easily openable vessel closure is excellent in the combination of the seal reliability and easy openability. However, this vessel closure still has several problems to be solved. More specifically, since severe processing such as riveting or scoring should be performed in the manufacture of vessel closures of this type, the material to be used is limited to a material excellent in the processability, such as aluminum. Therefore, even if a can body is formed of tin-free steel (TFS) or tinplate, the easily openable vessel closure should inevitably be formed of aluminum. In order to prevent environmental pollution with cans and attain a resource-saving effect, it is desired that used can bodies will be recovered and utilized again. However, when the material of the can body is different from the material of the closure, it is very difficult to utilize the recovered spent can bodies again. Moreover, in a vessel closure of this type, since a separated piece provided with a tab has a sharp cut edge, the finger of a person handling the vessel closure is often hurt by this sharp cut edge. Furthermore, if separated opening pieces are scattered, a problem of environmental pollution arises.

As another easily openable vessel closure different from the score line breaking type vessel closure, there is known a vessel closure comprising a can end member having a preformed opening and an easily peelable opening piece bonded to cover the periphery of the opening. In this vessel closure, bonding of the opening piece to the can end member is accomplished by adhesion with a pressure-sensitive adhesive or heat sealing using a heat-sealable resin. A vessel closure having an opening piece bonded according to the former bonding method, however, is defective in that since re-bonding is possible by application of a pressure after the vessel closure has once been opened, it is substantially impossible to warrant a purchaser that the can has not been opened. Furthermore, in the latter bonding method, it is very difficult to keep a good balance between the easy openability and seal reliability, and especially in case of a heat seal structure having a good seal reliability, when the opening piece is peeled, a feather-like resin film is left on the opening acting as a pouring or drinking mouth. That is, a so-called feathering phenomenon takes place and an unplesant feeling is given to a drinker.

A most serious problem of the easily openable vessel closure of the type having a preformed opening is that the cut end face of the opening is exposed to the interior of the can and corrosion of this cut end face and dissolution of iron into the content take place. Various trials have been made to cover the cut end face with a resin to solve this problem.

As a typical instance of such trials, there can be mentioned a method as disclosed in the specification of U.S. Pat. No. 3,339,788, in which an inner face covering tape is bonded to the inner side of the can end member to cover the opening and the cut edge of the opening is hidden. Indeed, according to this method, since the inner face covering tape is bonded to the adhesive layer of the opening piece, the cut edge can be prevented from being exposed to the interior of the can. However, it is difficult to completely stick the inner face covering tape to the cut edge, and a space having a triangular section is inevitably formed between the inner face covering tape and the cut edge of the opening. It is believed that the reason for formation of such a space is that when the inner face covering tape is applied, it is difficult to remove air from the step portion between the cut edge of the opening and the opening piece and also when the inner face covering tape is applied, it is difficult to perform the operation of sticking the tape closely to the adhesive layer of the opening piece after the tape has stuck closely to the cut edge of the opening. If the covering tape is not closely stuck to the cut edge of the opening, corrosion, for example, rusting, is advanced on this cut edge, and a long-period seal reliability is lost. Simultaneously, dissolution of iron into the content of the can is advanced and the property of retaining the flavor of the content is degraded. Such corrosion or dissolution of iron is especially conspicuous when hot filling or heat sterilization of the content is carried out.

There has already been proposed a method in which a resin is applied in the form of a powder paint or plastisol to the step portion formed between the cut edge of the opening and the opening piece and the applied resin is heated to cover the cut edge of the opening with the resin. A resin covering formed according to this method adheres tightly to the adhesive layer of the opening piece but it is difficult to stick the resin covering closely to the cut edge of the opening which has a very small area. In fact, if a vessel closure of this type is opened, it is observed that the resin covering layer applied to the cut edge of the opening is separated from the cut edge and transferred to the opening piece, and that prominent rusting is caused on the cut edge of the opening.

As will be apparent from the foregoing description, there has not been known an easily openable vessel closure in which an inner face covering resin is tightly bonded to the cut edge of an opening preformed on a can end member and even when the vessel closure is opened and an opening piece is peeled, this covering resin is left on the can end member while adhering closely to the cut edge of the opening.

SUMMARY OF THE INVENTION

It is therefore a primary object of the present invention to provide an easily openable vessel closure having a high seal reliability, a high corrosion resistance, a good flavor retaining property and a good easy openability in combination and a process for the preparation thereof.

Another object of the present invention is to provide an easily openable vessel closure comprising a can end member having a preformed opening, an easily peelable opening piece formed to cover the outer face of this opening and a covering resin layer applied on the inner face side of the can end member, in which even when the opening piece is peeled, the inner face covering resin layer is left on the can end member while adhering closely to the cut end of the opening, and means for tightly bonding the covering resin to the cut edge of the opening for forming such a vessel closure.

Still another object of the present invention is to provide a process for preparing an easily openable vessel closure having the above-mentioned covering structure with a high reliability and a high productivity.

More specifically, in accordance with one aspect of the present invention, there is provided an easily openable vessel closure comprising a can end member having a preformed opening, an easily peelable opening piece which is applied to the outer side of the can end member so that the opening piece covers said opening and adheres closely to the peripheral portion of said opening, and a protecting covering layer formed to cover the cut edge of the opening of the can end member, wherein the protecting covering layer is formed of a thermoplastic resin having a heat bondability and the protecting covering layer includes a film layer heat-bonded to the inner and outer peripheral portions of the opening and a projecting cover heat-bonded to the cut edge of the opening integrally with said film layer, and said opening piece is heat-bonded to the can end member through the protecting covering layer located outside the can end member and said protecting covering layer is stuck closely to the cut edge of the opening so that when the opening piece is peeled, the protecting covering layer is left on the side of the can end member.

DETAILED DESCRIPTION OF THE PREFERRED EMBODIMENTS

Figure 1:
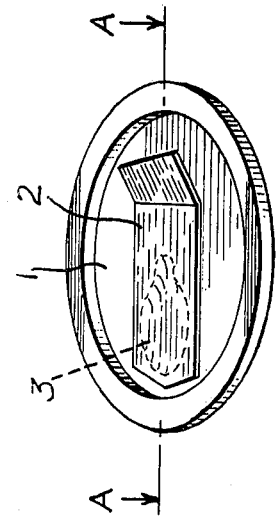
FIG. 1 is a perspective view of an easily openable vessel closure according to the present invention, which is seen from the outer face side.
Figure 2:
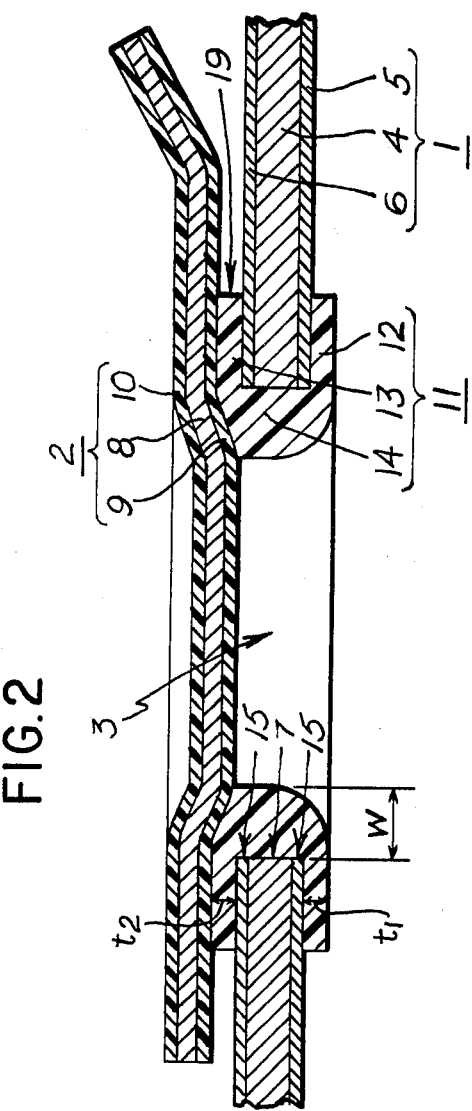
FIG. 2 is an enlarged view showing the section of the vessel closure of FIG. 1 taken along the line A—A in FIG. 1.

The present invention will now be described in detail with reference to embodiments illustrated in the accompanying drawings.

Structure of Vessel Closure

Referring to FIGS. 1 through 4 showing the entire structure of the easily openable vessel closure according to the present invention, this vessel closure comprises a can end member generally indicated by reference numeral 1 and an opening piece 2 generally indicated by numerical reference 2. The can end member 1 has a preformed opening 3, and the opening piece 2 is formed so that the opening piece 2 covers the opening 3 and is stuck closely to the peripheral portion of the opening 3.

The can end member 1 comprises a metal substrate 4 and protecting coatings 5 and 6 formed on the inner and outer faces of the metal substrate 4, and the metal substrate is exposed on the cut edge 7 of the opening 3. Since this exposed portion of the metal substrate 4 is brought into contact with the content, corrosion of this exposed portion or dissolution of the metal from this exposed portion is caused.

The opening piece 2 comprises a substrate 8 alone or in combination with an inner face protecting covering layer 9 located on the substrate on the side of the can end member.

The substrate 8 may further comprise an outer face protecting covering resin layer 10 on the outer face side. The opening piece 2 is stuck closely to the can end member 1 by fusion-bonding the protecting covering layer 9 to a film layer 13 of the can end member 1, whereby sealing is effected.

A protecting covering generally indicated by reference numeral 11 is formed to cover the cut edge 7 of the opening 3 of the can end member 1. One of the important features of the present invention is that this protecting covering 11 is formed of a thermoplastic resin having a heat bondability and the protecting covering 11 includes a film layer 12 heat-bonded to the peripheral portion of the opening 3 on the inner face side, a film layer 13 heat-bonded to the peripheral portion of the opening 3 on the outer face side and a protecting covering 14 heat-bonded to the cut edge 7 of the opening 3 integrally with the film layers 12 and 13 to completely cover the cut edge 7.

One of the most difficult problems encountered when the cut edge 7 of the opening 3 is that it is difficult to completely and sufficiently cover the angular portions 15 on the inner and outer face sides of the cut edge. When this covering is formed by applying a resin in the form of a flowable paint such as a resin solution, a plastisol, an organosol or a latex or a powder paint, the paint tends to flow out into the step formed between the opening piece 2 and the opening 3, and therefore, the covering is thin on the angular portions 15 and in an extreme case, the angular portions 15 are exposed. If the paint is applied so that the angular portions 15 are completely covered, the opening 3 per se is covered by the paint or peeling of the opening piece 2 becomes difficult.

In contrast, according to the present invention, since the projecting covering 14 is formed integrally with the film layers 12 and 13 tightly heat-bonded to the inner and outer face side peripheral portions of the opening 3, both the angular portions 15 of the cut edge 7 of the opening 3 are completely covered, and the above-mentioned various disadvantages can be eliminated effectively. The fact that the projecting cover 14 is formed integrally with the film layers 12 and 13 in the present invention can easily be confirmed by observation with a microscope.

In the present invention, for forming the projecting covering 14 integrally with the film layers 12 and 13, there is ordinarily adopted a method in which, as described hereinafter, prior to heat bonding of the opening piece 2, a perforated film or non-perforated film is heat-bonded to the periphery of the opening of the can end member on the inner face side, the portion of the film protruding to the central side from the contour of the opening is pushed toward the cut edge 7 of the opening 3, a film is heat-bonded to the periphery of the opening 3 on the outer face side, and both the films are integrated with each other by fusion in the state where holes corresponding to the opening 3 of the can end member 1 are formed on both the films.

Figure 5:
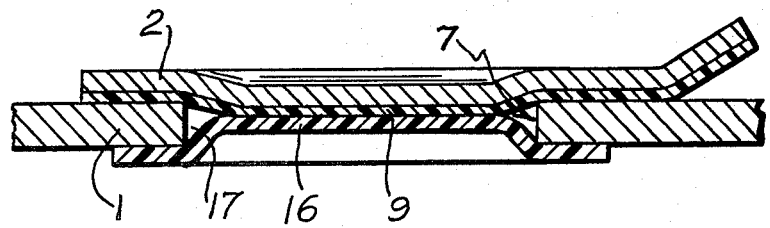
FIG. 5 is a sectional view of a conventional vessel closure.
Figure 6A:
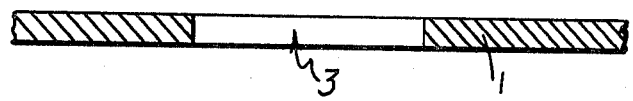
FIGS 6-A through 6-E are diagrams showing the steps of one embodiment of the process of the present invention, in which FIG. 6-A is a diagram showing the step of perforating a can end member, FIG. 6-B is a diagram illustrating the step of heat-bonding a film, FIG. 6-C is a diagram illustrating the step of perforating the heat-bonded film, FIG. 6-D is a diagram illustrating the step of forming a projecting cover on the cut edge of an opening and FIG. 6-E is a diagram illustrating the step of heat-bonding an opening piece.
Figure 6B:
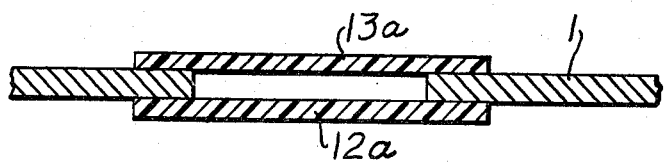
Figure 6C:
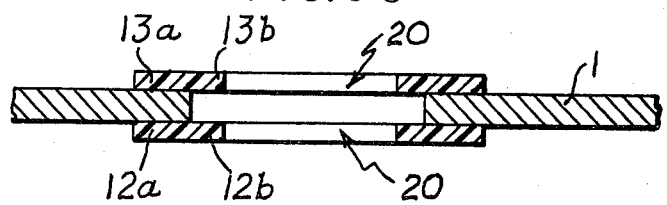
Figure 6D:
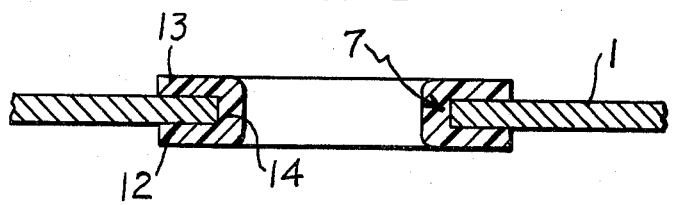
Figure 6E:
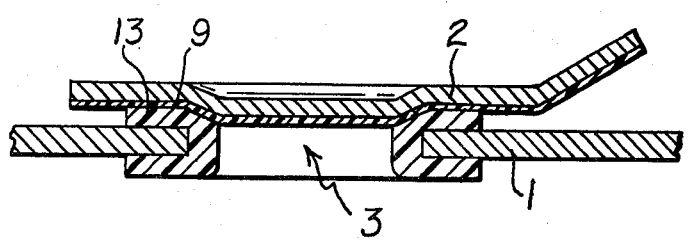
Figure 7A:
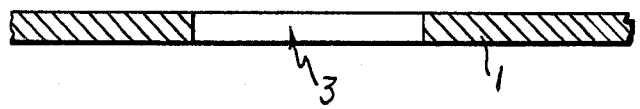
FIGS. 7-A through 7-E are diagrams illustrating the steps of another embodiment of the process of the present invention, in which FIG. 7-A is a diagram showing the step of perforating a can end member, FIG. 7-B is a diagram illustrating the step of heat-bonding a film on the inner face side, FIG. 7-C is a diagram illustrating the step of heat-bonding a film on the outer face side, FIG. 7-D is a diagram illustrating the step of perforating the heat-bonded films on the inner surface side and outer face side and FIG. 7-E is a diagram illustrating the step of heat-bonding an opening piece.
Figure 7B:
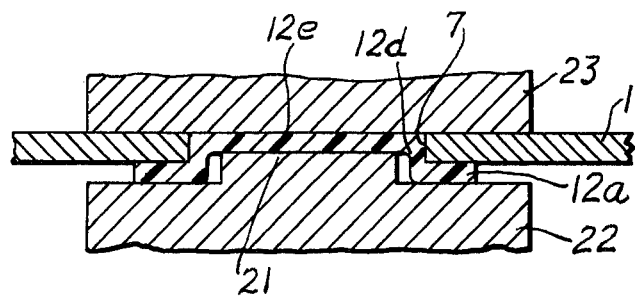
Figure 7C:
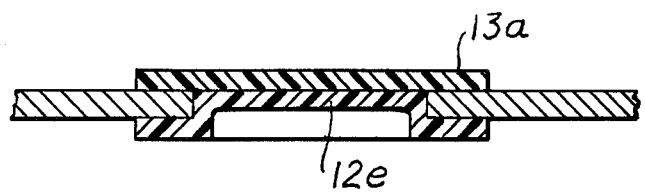
Figure 7D:
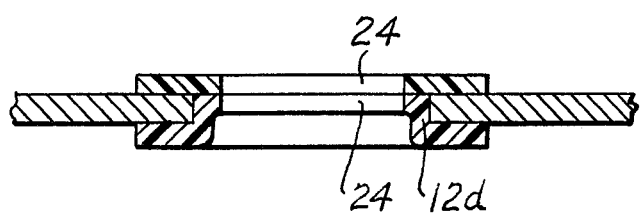
Figure 7E:
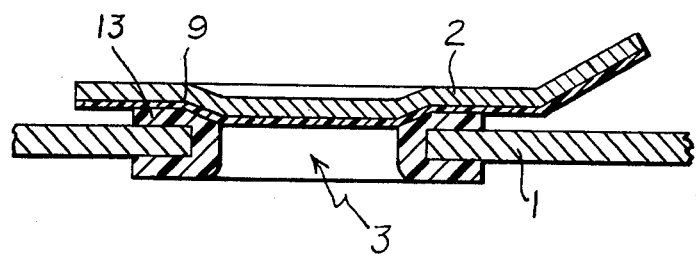

Another difficult problem encountered when the cut edge 7 of the opening 3 is covered with a resin is that it is difficult to completely stick a resin covering closely to the cut edge 7. For example, when, as shown in FIG. 5, a heat-bondable continuous film 16 is used as the covering on the inner face side and the cut edge 7 of the opening 3 is covered with the protecting covering layer 9 of the opening piece 2 and this film 16, a complete covering is formed around the cut edge 7, but it is very difficult to completely stick the film 16 closely to the cut edge 7 and a space 17 is inevitably formed between the film 16 and the cut edge 7. This will readily be understood from the fact that when the film 16 is heat-bonded to the can end member 1, there is left no way of escape for air present in the opening 3.

In contrast, according to the present invention, when two film layers are applied to the peripheral portions of the opening on both the inner and outer face sides, respectively, the portion of the film on the inner surface side which protrudes toward the central portion from the contour of the opening is pushed toward the cut edge of the opening and both the films are integrated with each other by fusion in the state where holes are formed in the central portions of the films, whereby a way of escape is left for air present in the opening 3 and a projecting covering 14 completely covering the cut edge 7 of the opening 3 without any space by heat bonding is formed. Since the covering 14 is completely stuck closely to the metal substrate 4 on the cut edge 7, corrosion or dissolution of the metal on the cut edge 7 can completely be inhibited.

Moreover, since the protecting covering 11 is formed by heat bonding and pushing of the film, this covering 11 is completely continuous and is completely free of defects observed in a covering formed by using a liquid paint or powder paint, such as pinholes.

Figure 3:
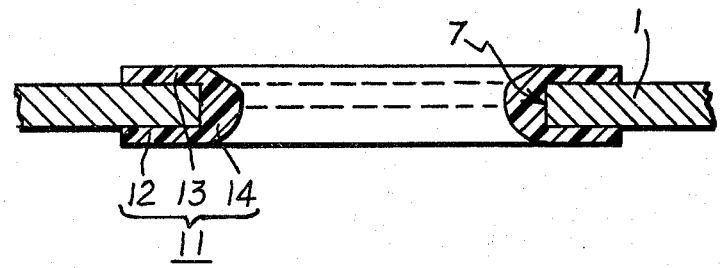
FIG. 3 is a sectional view of the vessel closure of FIG. 2 in which the opening piece is peeled.
Figure 4:
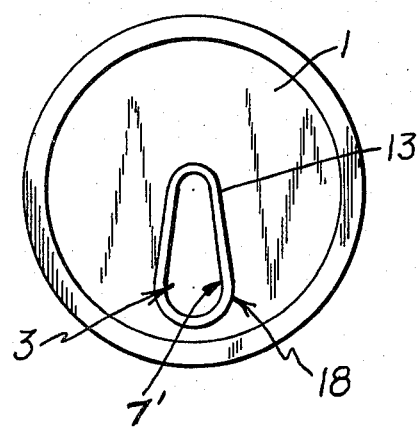
FIG. 4 is a top view of the vessel closure of FIG. 3.

The completeness of the protecting covering in the present invention can be confirmed from the fact when, as shown in FIGS. 3 and 4, the opening piece 2 is peeled from the can end member 1, the projecting covering 14 is completely stuck to the cut edge 7 of the opening 3 and is left on the side of the can end member 1 together with the film layers 12 and 13. More specifically, in case of a conventional easily openable vessel closure, even if any of a liquid paint, a powder paint or a film is used for protection and covering of the inner face, the covering for the cut edge 7 of the opening 3 is transferred and stuck closely to the opening piece 2 when the opening piece 2 is peeled, and the covering is not left on the side of the can end member 1 at all. In contrast, in the vessel closure of the present invention, since the projecting covering 14 is heat-bonded to the cut edge 7 of the opening so that the projecting covering 14 is tightly stuck to the periphery of the opening integrally with the heat-bonded film layers 12 and 13, even if the opening piece 2 is peeled, the projecting covering 14 is left on the side of the can end member 1.

Furthermore, since the covering 14 which is stuck closely to the cut edge of the opening of the can end member is pushed under melting conditions together with the film layers 12 and 13, the covering 14 is smooth in the shape and when the opening piece is peeled, the appearance of the opening is not impaired and occurrence of the above-mentioned feathering phenomenon can be prevented effectively.

In the present invention, it is especially preferred that the projecting covering 14 be projected inwardly of the cut edge 7 of the opening 3 along a length $\omega$ 0.1 to 500 times, especially 0.5 to 100 times, as large as the thickness t of the film layer 12. When this length is too small and below the above range, the completeness of covering or adhesion on the cut edge is lost and when this length is too large, a space of confined air is readily formed. From the viewpoint of the easiness in heat bonding and processing and also in view of the completeness of covering, it is preferred that each of the thickness $t_1$ of the film layer 12 and the thickness $t_2$ of the film layer 13 be from 5 to 1000 $\mu$m, especially from 20 to 500 $\mu$m.

According to one preferred embodiment of the present invention, the protecting covering 9 of the opening piece 2 on the side of the can end member is formed by coating a thermosetting or thermoplastic resin, and a heat-sealable resin layer 13 is made present in the lamination order opposite to the order in the conventional vessel closure. If this heat seal structure is adopted, when the opening piece is peeled, a resin layer or feather-like fragment thereof is not left on the opening irrespectively of the kind of the layer in which peeling is actually advanced, and a beautiful state is left after peeling of the opening piece. For example, in the embodiment shown in FIGS. 2 and 3, the interlaminar peel strength between the covering layer 6 or 9 and the heat-bondable resin layer 13 is higher than the cohesive failure strength of the resin layer 13 per se, and therefore, peeling of the opening piece is accomplished by the cohesive failutre of the resin layer 13. Also in this case, the resin layer 13 is left from the portion of the opening 3 and leaving of a resin film or a fragment thereof on the opening 3 after peeling of the opening piece can completely be prevented. Of course, when peeling of the opening piece 2 is advanced in the interface between the covering 9 and the heat-bondable resin layer 13, for the same reason as described above, leaving of a resin film or a fragment thereof on the opening 3 can completely be prevented. Furthermore, even if peeling of the opening piece 2 is advanced in the interface between the covering 9 and the substrate 8, since in the portion of the opening 3, the resin layer 11 is not formed below the covering 9 and the adhesion force of the covering 9 is much larger than the shearing force of the covering 9, shearing of the covering 9 is caused on the edge portion of the opening 3 and the covering 9 confronting the opening 3 is completely transferred to the opening piece 2.

From the foregoing description, it will readily be understood that in the easily openable vessel closure of the present invention, a high seal reliability is guaranteed by the heat-bondable resin layer 13 on the periphery of the opening and when the vessel closure is opened, leaving of a resin film on the opening of the can end member is completely prevented.

According to still another preferred embodiment of the present invention, as shown in FIG. 4, the film layer 13 on the outer face side periphery of the opening of the can end member is formed to have an outer contour 18 similar to but slightly larger than the contour of the opening 3 of the can end member 1. The heat-bondable resin layer 13 should naturally have an opening corresponding to the opening 3 of the can end member 1, and the contour of this opening is similar to and concentric with the outer contour 18. Accordingly, the can end member 1 and the opening piece 2 are bonded together by heat sealing through the resin layer 13 having a constant width in the peripheral portion of the opening, whereby sealing with a highly improved reliability can be formed. Moreover, the heat seal width in the peripheral portion is substantially constant and relatively narrow, and a space 19 (see FIG. 2) should naturally be formed between the opening piece 2 and the can end member 1 and this space acts as a peeling-initiating guide (notch) on opening of the vessel closure. Accordingly, even if the opening piece 2 and the can end member 1 are bonded with a considerably high heat seal strength, opening by peeling can easily be accomplished.

In this preferred embodiment of the present invention, since the outer contour 18 of the heat-bondable resin layer 13 is substantially similar to and slightly larger than the contour of the opening 3, after the opening piece 2 has been peeled, the appearance of the periphery of the opening to be used as the pouring or drinking mouth is hardly impaired and a beautiful peeled face is formed by dint of the above-mentioned peeling-initiating guide action, with the result that the appearance of the peripheral portion of the opening is kept beautiful after peeling of the opening piece.

Incidentally, in the present invention, the shape of the opening 3 of the can end member is not particularly critical, but the opening 3 may take any of a circular shape, an ellipsoidal shape, and egg-like shape and a drip-like shape, and the resin layer 13 is formed to have a shape similar to the shape of the opening 3.

Preparation of Vessel Closure

The vessel closure of the present invention is prepared according to processes roughly divided into the following two groups and modifications thereof.

In accordance with another aspect of the present invention, there is provided a process for the preparation of vessel closures which comprises in combination the steps of forming a laminate comprising a can end member and thermoplastic resin film layers heat-bonded to the inner and outer faces of the can end member, each of the inner and outer film layers having an opening corresponding to an opening formed on the can end member, pushing edge portions of the openings of the thermoplastic resin film layers in the molten state into the cut edge of the opening of the can end member to form a projecting cover heat-bonded to the cut edge of the opening of the can end member, applying an opening piece to the outer side of the can end member to cover the opening of the can end member, and heat-bonding the opening piece to the peripheral portion of the opening of the can end member through the thermoplastic resin film layers.

These steps will now be described in detail with reference to FIGS. 6-A through 6-E.

At first, a can end member 1 is perforated by a perforating punch or press (not shown) to form an ppening 3, and if necessary, burs are removed (see FIG. 6-A).

Then, heat-bondable resin films 12a and 13a are applied to the inner and outer faces of the can end member 1 to cover the opening 3 and are heat-bonded to the peripheral portion of the opening 3 (see FIG. 6-B).

This heat bonding can easily be accomplished by heating the can end member by high frequency induction heating, direct flame heating or infrared ray heating and pressing the films thereto. Holes having a diameter equal to or smaller than the diameter of the opening 3 are formed on the heat-bonded films 12a and 13a substantially coaxially with the opening 3 (see FIG. 6-C). Perforation of the films is accomplished by an optional method such as punching or shearing, or the holes may be formed by applying a burner to the central portions of the films. The size of the holes is determined so that the projection length of the flange-like covering to be formed is within the above-mentioned range.

In the present invention, it is preferred that the end portion of at least one of the perforated films 12a and 13a be projected inwardly of the opening 3. In this case, the projected film portions 12b and 13b (see FIG. 6-C) are heated and the heated end portions 12b and 13b are pushed in the molten state into the opening 3, especially the cut end side of the opening 3, to form a projecting covering 14 (see FIG. 6-D). Pushing of the end portions can easily be accomplished by pressing the end portion 12b and 13b to a mold having a specific tapering shape or pressing them against a plate-like elastic member.

In the present invention, since films are heat-bonded to the peripheral portions of both the sides of the opening and the end portions of these films are pushed into the cut edge of the opening, covering of the angular portion of the cut edge of the opening is more complete than in the case where a covering film is applied to one side of the opening alone. Furthermore, the top ends of the resin films pushed into the opening are fusion-bonded to each other, and therefore, the completeness of covering of the cut edge is enhanced. Moreover, since both the films are perforated, when the end portions of the films are pushed into the opening, air present in the opening is excluded and heat bonding of the films to the cut edge of the opening is accomplished in this state. Accordingly, formation of a space between the covering and the metal substrate can be prevented effectively.

Incidentally, when the film layers to be heat-bonded are sufficiently thick, the cut edge of the opening of the can end member may be covered by a method in which the size of openings formed on the films is made equal to the size of the opening of the can end member and the film ends in the peripheral portion of the opening are pushed into the opening under application of a pressure.

Finally, an opening piece 2 is applied to the outer face of the can end member 1 to cover the opening 3, and in the peripheral portion of the opening 3, the opening piece 2 is heat-bonded to the can end member 1 through the outer heat-bondable film 13 and protecting covering layer 9 (see FIG. 6-E). Heat bonding of the opening piece 2 is accomplished by means similar to the heat-bonding means adopted for the films 12a and 13a.

In the present invention, some of the above-mentioned steps may be conducted simultaneously, or the sequential order of the steps may be changed. For example, it is preferred that the step of heat-bonding the opening piece, shown in FIG. 6-E, and the pushing step shown in FIG. 6-D be carried out simultaneously. More specifically, the can end member 1 having the film ends 12b and 13b formed thereon and the opening piece 2 are piled together in the above-mentioned positional relationship and the can end member 1 is pressed from above and below under heating by means of an elastic member, such as a rubber mat, applied to the can end member 1, whereby heat bonding of the opening piece and pushing molding of the film ends 12b and 13b can be accomplished simultaneously and conveniently. In this case, it is preferred that heating be accomplished by high frequency induction heating. Since the film end portions 12b and 13b are located in close proximity to the periphery of the opening, with heating of the metal substrate, the film end portions 12b and 13b can easily be heated to the melting temperature. The order of first heat-bonding the films 12a and 13a to the can end member and then forming holes 20 on the films 12a and 13a may be reversed. More specifically, there may be adopted a modification in which holes 20 are first formed on the films 12a and 13a and the perforated films are then heat-bonded to the can end member.

Furthermore, there may be adopted a method in which the films 12a and 13a are heat-bonded to the can end member and the resulting laminate is perforated at one time. As another modification, there may be mentioned a method in which the can end member is perforated to form an opening 3, the film 12a is heat-bonded to the can end member, the film 12a is then perforated to form an opening 20, and the film 13a is heat-bonded to the can end member and then perforated. As is obvious to these skilled in the art, the diameter of the hole formed on the film 12a need not always be equal to the diameter of the hole formed on the film 13a.

Instead of the above-mentioned molding method of pushing the film ends directly into the opening of the can end member, there may be adopted a method in which the film ends are heated to form resin beads by shrinkage and the resin beads are pushed into the opening.

In this case, perforation of the heat-bonded films 12a and 13a and formation of the resin beads may be conducted in sequence in the same station, and perforation by a gas burner and formation of the beads by thermal shrinkage may be accomplished simultaneously.

In accordance with still another aspect of the present invention, there is provided a process for the preparation of easily openable vessel closures, which comprises in combination the steps of forming a laminate comprising a can end member and thermoplastic resin film layers heat-bonded to the inner and outer faces of the can end member, each of the inner and outer film layers having an opening corresponding to an opening formed on the can end member and the end portion of one film layer being bent along the cut edge of the opening of the can end member, heat-bonding the bent portion of the film layer to the cut edge of the opening of the can end member and simultaneously integrating the end portions of the openings of both the film layers with each other by fusion bonding, and applying an opening piece to the outer face of the can end member to cover the opening of the can end member and heat-bonding the opening piece to the periphery of the opening of the can end member through said thermoplastic resin film layers.

The steps of this preparation process will now be described in detail with reference to FIGS. 7-A through 7-E.

At first, an opening 3 is formed on a can end member 1 as in the step shown in FIG. 6-A (this step is illustrated in FIG. 7-A).

Then, a heat-bondable resin film 12a is applied to the inner face (lower face) of the can end member 1 to cover the opening 3 and the film 12a is heat-bonded to the peripheral portion of the opening 3 (see FIG. 7-B). At this step, a pressing mold 22 having a projection having a size slightly smaller than that of the opening 3 of the can end member 1 is arranged on the inner face side of the can end member and a plate-like pressing member 23 is arranged on the outer face side of the can end member, and the can end member heated at the melting temperature of the film layer and the film layer is pressed by these pressing molds 22 and pressing member 23, whereby the above-mentioned heat bonding of the heat-bondable resin film is accomplished and simultaneously, the portion of the film projecting toward the center of the opening of the can end member inwardly of the contour of the opening is upwardly pushed. By this pushing operation, there may be formed a portion 12d of the film bent along the cut edge 7 of the opening of the can end member in addition to the heat-bonded portion of the film. The top face of the portion 12e of the film projecting toward the center inwardly of the contour of the opening of the can end member is on the same level as that of the top face of the can end member 1. Since the film is heated by thermal conduction from the cut edge of the opening of the can end member, bending of the film can easily be accomplished according to the above-mentioned procedures.

Then, a heat-bondable resin film 13a is applied to the outer face (upper face) of the can end member 1 and heat-bonded to the peripheral portion of the opening of the can end member (see FIG. 7-C).

At this step, although the film 13a is lapped on the film 12e, fusion bonding of both the films is not yet effected.

In this state, a hole 24 having a shape similar to but slightly smaller than the shape of the opening 3 is formed on each of the film 12e and film 13a (see FIG. 7-D). The size of the hole 24 is made equal to or slightly smaller than the difference between the size of the opening of the can end member and the twice of the thickness of the bent portion 12e of the film.

Finally, at the step shown in FIG. 7-E, an opening piece 2 is applied to the outer face of the can end member 1 to cover the opening 3 and heat-bonded to the can end member 1 in the periphery of the opening 3 through the outer heat-bondable film 13, and simultaneously, the bent portion 12d of the film is heat-bonded to the cut edge 7 of the opening 3 and the edges of the openings of both the films are integrated with each other by fusion bonding.

In the embodiment shown in FIG. 7-E, fusion bonding of the edges of the openings of both the films is accomplished simultaneously with heat bonding of the opening piece, but as will be obvious to those skilled in the art, these operations may be carried out in sequence.

Figure 8A:
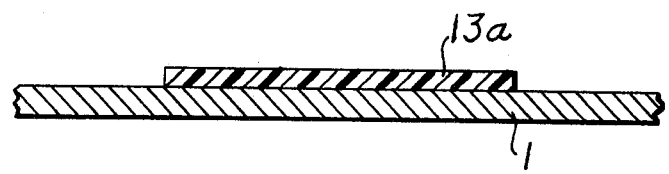
FIGS. 8-A and 8-B are diagrams showing the steps of a modification of the process shown in FIGS. 7-A through 7-E, in which FIG. 8-A is a diagram illustrating the step of heat-bonding a film on the outer face side and FIG. 8-B is a diagram illustrating the step of perforating a can end member to which the film has been heat-bonded.
Figure 8B:
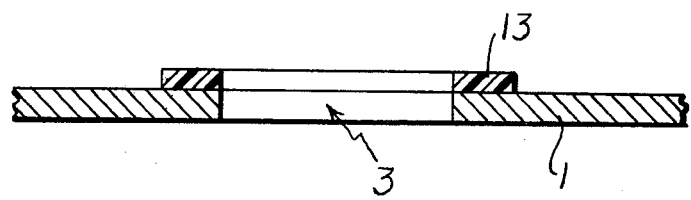

Furthermore, the step of heat-bonding the outer film layer 13a prior to perforation as shown in FIG. 8-A, the step of forming an opening 3 on the resulting laminate formed by heat bonding as shown in FIG. 8-B, the step of heat-bonding and pushing the inner film layer as shown in FIG. 7-B, the perforation step shown in FIG. 7-D and the step of heat-bonding the opening piece and fusion-bonding the ends of the openings of the films to each other as shown in FIG. 7-E may be conducted in succession according to the recited order.

Heat-Bondable Film

In the present invention, the thermoplastic film used to cover the cut edge of the opening of the can end member is a resin having a heat bondability to a metal substrate of the can end member or a protecting coating formed thereon, and it is preferred that this resin should have a melting or softening point of 30° to 300° C., especially 70° to 260° C.

From the viewpoint of the heat bondability, a thermoplastic polymer containing a carbonyl group

derived from a carboxylic acid, carboxylic acid salt, carboxylic anhydride, carboxylic acid ester, carboxylic acid amide, ketone, carbonic acid ester or urea in the main or side chain is preferred as the thermoplastic resin. When a thermoplastic polymer containing the carbonyl group at a concentration of 12 to 1400 meq, especially 50 to 1200 meq, per 100 g of the polymer, is used, best results can be obtained with respect to the heat bondability and the corrosion resistance. Furthermore, since the thermoplastic resin is applied to the can end member in the form of a film, it is indispensable that the thermoplastic resin should have a film-forming molecular weight.

The thermoplastic polymer may be obtained by introducing a monomer containing the above-mentioned functional group into a main polymer chain by means such as homopolymerization or copolymerization or by bonding such monomer to a thermoplastic polymer by graft polymerization or terminal treatment.

Suitable examples of such thermoplastic polymers are described below though polymers applicable to the present invention are not limited to those exemplified below.

(a) Polyesters comprising recurring units represented by the following general formula:

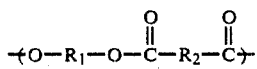

or

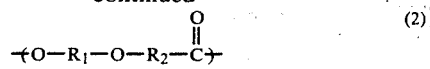

wherein $R_1$ stands for an alkylene group having 2 to 6 carbon atoms and $R_2$ stands for an alkylene or arylene group having 2 to 24 carbon atoms, such as polyethylene terephthalate, polyethylene terephthalate/adipate, polyethylene terephthalate/sebacate, polytetramethylene terephthalate, polytetramethylene isophthalate, polyteramethylene terephthalate/isophthalate, polyethylene terephthalate/isophthalate, polytetramethylene/ethylene terephthalate, polyethylene/tetramethylene terephthalate/isophthalate and polyethylene/hydroxybenzoate.

(b) Homopolymer or copolymers of monomers represented by the following general formula (3) or copolymers containing monomers of the general formula (3) and olefins or other vinyl monomers or acrylic modified polyolefins:

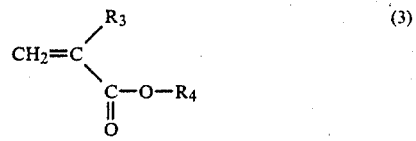

wherein $R_3$ stands for a hydrogen atom or a lower alkyl group and $R_4$ stands for a hydrogen atom or an alkyl group having 1 to 12 carbon atoms, such as polyacrylic acid esters, polymethacrylic acid esters, ethylene/acrylic acid copolymers, acrylic acid ester/acrylic acid copolymers, ethylene/acrylic acid ester/acrylic acid copolymers, ethylene/acrylic acid copolymers, styrene/methacrylic acid ester/acrylic acid copolymers, acrylic acid ester/vinyl chloride copolymers, acrylic acid ester-grafted polyethylene, methacrylic acid ester/vinyl chloride copolymers, styrene/methacrylic acid ester/butadiene copolymers and methacrylic acid ester/acrylonitrile copolymers.

(c) Copolymers of vinyl esters represented by the following formula (4) with olefins or other vinyl monomers or partial saponification products thereof:

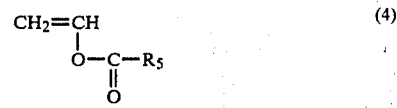

wherein $R_5$ stands for a hydrogen atom, an alkyl group or a phenyl group, such as partially saponified ethylene/vinyl acetate copolymers, ethylene/vinyl propionate copolymers, ethylene/vinyl acetate copolymers, acrylic acid ester/vinyl acetate copolymers and vinyl chloride/vinyl acetate copolymers.

(d) Ionomers (ion-crosslinked olefin copolymers) such as resins obtained by neutralizing copolymers of olefins with unsaturated carboxylic acids optionally with other vinyl monomers, with an alkali metal, an alkaline earth metal or an organic base, for example, Surlyns supplied by Du Pont Co., U.S.A.

(e) Copolymers of maleic anhydride with other vinyl monomers or maleic anhydride-modified polyolefins such as maleic anhydride/styrene copolymers, maleic anhydride-modified polypropylene and maleic anhydride-modified polyethylene.

(f) Polycarbonates having recurring units represented by the following formula:

wherein $R_6$ stands for a hydrogen group having 8 to 15 carbon atoms,
such as poly-p-xylene-glycol-bis-carbonate, polydihydroxydiphenyl-methane-carbonate, polydihydroxydiphenyl-ethane-carbonate, polydihydroxydiphenyl-2,2-propane-carbonate and polydihydroxydiphenyl-1,1-ethane-carbonate.

(g) Polyamides having recurring units represented by the following general formula:

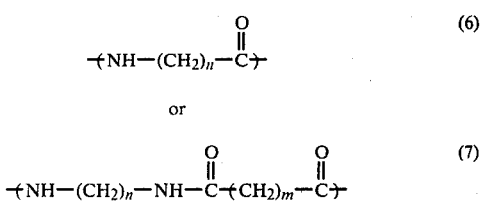

wherein n is a number of from 3 to 13 and m is a number of from 4 to 11,
such as poly-ω-aminocaproic acid, poly-ω-aminoheptanoic acid, poly-ω-aminopelagonic acid, poly-ω-aminocaprylic acid, poly-ω-aminodecanoic acid, poly-ω-aminoundecanoic acid, poly-ω-aminododecanoic acid, poly-ω-aminotridecanoic acid, polyhexamethylene-adipamide, polyhexamethylene-sebacamide, polyhexamethylene-dodecamide, polyhexamethylene-tridecamide, polydecamethylene-adipamide, polydecamethylene-sebacamide, polydecamethylene-dodecamide, polydecamethylene-tridecamide, polydodecamethylene-adipamide, polydodecamethylene-sebacamide, polydodecamethylene-dodecamide, polydodecamethylene-tridecamide, polytridecamethylene-adipamide, polytridecamethylene-sebacamide, polytridecamethylene-dodecamide, polytridecamethylene-tridecamide, polyhexamethylene-azelamide, polydecamethylene-azelamide, polydodecamethylene-azelamide, polytridecamethylene-azelamide, and copolyamides thereof.

These thermoplastic polymers may be used singly or in the form of a blend of two or more of them.

The thermoplastic polymer which is most valuable for attaining the objects of the present invention and is preferred from the viewpoint of the property of retaining the flavor and taste of the content is a polyester as mentioned above, especially a polyester having a relatively low melting point.

As another thermoplastic polymer suitable for attaining the objects of the present invention, there can be mentioned ionomers, acid-modified polyolefins, polycarbonates and polyamides.

Formation of the thermoplastic resin into a film can be accomplished by known means such as the T-die method or inflation method.

The film used for covering may be a single-layer film or a multi-layer or laminated film. In short, any film can be used so far as heat bonding to the can end member and heat bonding to the cut edge of the opening can be performed smoothly.

Can End Member

According to the present invention, an easily openable vessel closure is prepared from a can end member having a preformed opening and an opening piece to be heat-bonded thereto, and by virtue of this feature, no processing limitation is imposed on the metal blank to be used and the same metal blank as that of the can body can be used for the can end member. Therefore, it is possible to recover the used can and utilize it as the resource again effectively.

As the metal blank for the can end member, there can be mentioned an untreated steel plate (black plate), electrolytically plated and hot-dipped steel plates such as tinplate, zinc-plated steel plates and chromium-plated steel plates, steel plates chemically treated with chromic acid or phosphoric acid, and electrochemically treated plates such as steel plates electrolytically treated with chromic acid (tin-free steel, TFS). Furthermore, plates of light metals such as aluminum may be used. It is preferred that the thickness of the metal blank be 0.10 to 0.70 mm, especially 0.15 to 0.55 mm.

Such metal blank, especially a surface-treated steel plate, may be used in the uncoated state, but it is ordinarily preferred that the inner face and/or outer face of the metal blank be coated. As the protecting paint used for the coating, there can be mentioned paints of thermosetting resins such as phenol-formaldehyde resins, furan-formaldehyde resins, xylene-formaldehyde resins, ketone-formaldehyde resins, urea-formaldehyde resins, melamine-formaldehyde resins, alkyd resins, unsaturated polyester resins, epoxy resins, bismaleimide resins, triallyl cyanurate resins, thermosetting acrylic resins, silicone resins and oleoresins, paints of thermoplastic resins such as vinyl chloride-vinyl acetate copolymers, partially saponified vinyl chloride-vinyl acetate copolymers, vinyl chloride-maleic acid copolymers, vinyl chloride-maleic acid-vinyl acetate copolymers, acrylic polymers and saturated polyester resins, and mixtures thereof.

Opening Piece

As pointed out hereinbefore, the opening piece comprises a substrate alone or in combination with a protecting covering layer formed on at least one side of the substrate. The substrate should have both the flexibility and gas barrier property. Accordingly, a metal foil such as an aluminum foil, a tinplate foil, a steel foil or an iron foil is advantageously used as the substrate. As the gas-barrier substrate, there may be used not only such metal foils but also films or metal-deposited films of gas-barrier resins such as saponified ethylene-vinyl acetate copolymers, vinylidene chloride resins, vinyl chloride resins, high-nitrile resins, polyvinyl alcohol resins, biaxially stretched polyester resins and biaxially stretched polypropylene resins.

The above-mentioned heat-bondable resins may be used for formation of the protecting covering layer. However, in order to provide a good easy openability and prevent occurrence of the feathering phenomenon, it is preferred that a resin paint be used for formation of the protecting covering layer. Of course, the protecting covering layer may be formed by forming a coating on the substrate and forming a heat-bondable resin layer on the coating.

The coating to be formed on the substrate should be heat-sealable to the above-mentioned heat-bondable resin. Furthermore, since the coating has direct contact with the content, the coating should have an excellent corrosion resistance. Accordingly, a resin or resin composition containing a polar group such as a carboxylic acid, carboxylic acid ester, carboxylic acid amide, hydroxyl, ether or epoxy group at a concentration of 10 to 2000 millimoles per 100 g of the resin is preferably used. As such resin, there can be mentioned paints of thermosetting resins such as phenol-formaldehyde resins, furan-formaldehyde resins, xylene-formaldehyde resins, ketone-formaldehyde resins, urea-formaldehyde resins, melamine-formaldehyde resins, alkyd resins, unsaturated polyester resins, epoxy resins, bismaleimide resins, triallyl cyanurate resins, thermosetting acrylic resins, silicone resins and oleoresins, and paints of thermoplastic resins such as vinyl chloride-vinyl acetate copolymers, partially saponified vinyl chloride-vinyl acetate copolymers, vinyl chloride-maleic acid copolymers, vinyl chloride-maleic acid-vinyl acetate copolymers, acrylic polymers and saturated polyester resins. These resin paints may be used singly or in the form of a mixture of two or more of them.

In view of the heat sealability and corrosion resistance, it is preferred that the thickness of the coating formed on the opening piece be 1 to 20 μm, especially 2 to 15 μm. The coating can easily be formed by coating a solution or dispersion containing 10 to 50% by weight of a resin as described above on the substrate of the opening piece and baking the coated solution or dispersion at a temperature of 150° to 400° C. for 5 seconds to 20 minutes.

The surface of the substrate on the side on which the coating is formed may be subjected, especially in case of the metal foil substrate, to a known surface treatment such as a treatment with phosphoric acid and/or chromic acid, an electrolytic treatment with chromic acid, a boehmite treatment, an alumite treatment or an organic titanium or zirconium compound-forming surface treatment.

A coating similar to the above-mentioned coating may be formed on the other face of the opening piece, or a high-strength film such as a biaxially stretched polyester film or a biaxially stretched polypropylene film may be bonded to the other surface for attaining a reinforcing effect.

The present invention will now be described in detail with reference to the following Examples that by no means limit the scope of the present invention.

EXAMPLE 1

A coating having a thickness of 5 μm was formed on one surface of an electrolytically chromic acid-treated steel plate (tin-free steel; TFS; tempering degree of T4CA) having a thickness of 0.23 mm by coating and baking a mixed paint of an epoxy resin (aromatic epoxy resin derived from bisphenol A and epichlorohydrin) and a phenolic resin (polycondensate of a phenol and an aldehyde obtained in the presence of an alkaline catalyst), and on the other surface of the steel plate, a coating having a thickness of 5 μm was formed by coating and baking a mixed paint of an epoxy resin (aromatic epoxy resin derived from bisphenol A and epichlorohydrin) and a urea resin (butyl-etherified polycondensate of urea and formaldehyde) and a top coating having a thickness of 5 μm was formed on the so-formed coating by coating and baking a paint of a vinyl chloride/vinyl acetate copolymer. The coated steel plate was formed into a vessel closure-like member having an outer diameter of 67 mm so that the surface coated with the mixed paint of the epoxy resin and phenolic resin alone was the outer surface of the final vessel, and the peripheral curl portion of the vessel closure-like member, which was to be double-seamed at the can body-forming step, was coated with an SBR type sealing compound and was then dried to form a can end member.

A drip-shaped opening having a width of 10 mm and a length of 20 mm was formed on the flat portion of the can end member by means of a punch and a die, whereby a pouring mouth was formed. A polytetramethylene terephthalate/isophthalate film having a thickness of 150 μm (having a melting point of 170° C.) was punched into a shape similar to but slightly larger than the shape of the opening formed on the steel plate, that is, a drip-like shape having a width of 14 mm and a length of 24 mm, and the punched film was placed on the opening of the steel plate on the side to be formed into the inner face of the final vessel. A polytetramethylene terephthalate/isophthalate having a thickness of 50 μm (having a melting point of 170° C.) was punched into a drip-like shape similar to but slightly larger than the shape of the opening formed on the steel plate, that is, a drip-like shape having a width of 14 mm and a length of 24 mm, and the punched film was placed on the opening of the steel plate on the side to be formed into the outer face of the final vessel.

Both the films were pressed under a pressure of 5.3 Kg/cm$^2$ to the peripheral portion of the opening by a pressing member formed of brass, and simultaneously, the peripheral portion of the opening was heated at 200° C. by high frequency induction heating to heat-bond both the films to the can end member.

The films heat-bonded to the inner and outer faces of the pheripheral portion of the opening were perforated by means of a punch and a die so that drip-shaped openings similar to but smaller than the openings of the can end member were formed on both the films with margins having a width of 0.5 mm being left from the cut edge of the opening of the can end member.

A biaxially stretched polyethylene terephthalate film having a thickness of 50 μm was bonded through an adhesive to one surface of a soft aluminum foil having a thickness of 50 μm, and a polytetramethylene terephthalate/isophthalate film having a thickness of 20 μm (having a melting point of 170° C.) was fusion-bonded to the other face of the aluminum foil to form a laminate film. The laminate film was cut in a width of 16 mm and a length of 36 mm to form an opening piece.

The opening piece was placed on the can end member so that the heat-bondable resin layer of the polytetramethylene terephthalate/isophthalate was brought into contact with the peripheral portion of the opening on the outer face, and the opening piece was pressed under a pressure of 10 Kg/cm$^2$ by a pressing member formed of a heat-resistant rubber. Simultaneously, the peripheral portion of the opening was heated at 250° C. by high frequency induction heating and the heat-bondable resin layer of the opening piece was heat-bonded to the polytetramethylene terephthalate/isophthalate film having a thickness of 50 μm, which was heat-bonded to the peripheral portion of the opening to be formed into the outer face of the final vessel. This polytetramethylene terephthalate/isophthalate film and the polytetramethylene terephthalate/isophthalate film having a thickness of 150 μm, which was heat-bonded to the inner face side peripheral portion of the opening, were heat-molded and fusion-bonded to each other, whereby a protecting covering layer for the cut edge of the opening, which was integrated with the film layers heat-bonded to the outer and inner face side peripheral portions of the opening, was formed.

The easily openable vessel closure according to the present invention was prepared by the foregoing steps. An orange juice was hot-filled in a bonded can body for a 250-gram can, which had an inner diameter of 52.3 mm and was formed of a TFS plate having a thickness of 0.22 mm and to the other end of which an ordinary vessel closure was double-seamed, and the easily openable vessel closure of this Example was double-seamed to one end of the filled can body to obtain a canned fruit juice drink.

COMPARATIVE EXAMPLE 1

The same opening as described in Example 1 was formed on the same can end member as used in Example 1. A biaxially stretched polyethylene terephthalate film having a thickness of 50 μm was bonded to one surface of a soft aluminum foil having a thickness of 50 μm and an acrylic adhesive layer having a thickness of 10 μm was formed on the other surface of the aluminum foil. This aluminum foil was cut into a width of 16 mm and a length of 36 mm to form an opening piece. The opening piece was placed on the opening of the can end member so that the adhesive layer was brought into contact with the surface of the can end member to be formed into the outer face of the final vessel, and the opening piece was pressed under a pressure of 10 Kg/cm$^2$ to form an easily openable vessel closure.

An orange juice was hot-filled in the same can body as described in Example 1 and the so-prepared easily openable vessel closure was double-seamed to the filled can body to obtain a canned fruit juice drink.

COMPARATIVE EXAMPLE 2

A polypropylene film having a thickness of 20 μm and including an acrylic adhesive layer having a thickness of 10 μm, bonded to one surface thereof, was cut into a width of 16 mm and a length of 26 mm to form a protecting covering film. This protecting covering film was placed on the opening of the same easily openable vessel closure as described in Comparative Example 1 so that the adhesive layer was brought into contact with the inner face of the vessel closure. Then, the protecting covering film was pressed by a pressing member formed of a rubber elastomer so that the adhesive layer was closely stuck to the inner face coating of the vessel closure and also to the acrylic adhesive layer of the same opening piece as described in Comparative Example 1, whereby an easily openable vessel provided with the opening piece and protecting covering layer was prepared. When the state of the contact between the cut edge of the opening and the protecting covering layer in the easily openable vessel closure of this Comparative Example was examined, it was found that the protecting covering layer was not closely stuck to the cut edge of the opening and the easily openable vessel closure of this Comparative Example was apparently different from the easily openable vessel closure of Example 1 in which the cut edge of the opening was closely covered with the protective covering layer without any air space being left.

An orange juice was hot-filled in the same can body as described in Example 1 and the so-prepared easily openable vessel closure was double-seamed to the filled can body to obtain a canned fruit juice drink.

COMPARATIVE EXAMPLE 3

The same opening as described in Example 1 was formed by perforating the same can end member as described in Example 1. The same opening piece as described in Example 1 was placed on the opening so that the heat-bondable resin layer of the opening piece was brought into contact with the face of the opening to be formed into the outer face of the final vessel, and the opening piece was pressed under a pressure of 10 Kg/cm$^2$ and simultaneously, the peripheral portion of the opening was heated at 250° C. by high frequency induction heating, whereby the opening piece was heat-bonded to the can end member.

A polytetramethylene terephthalate/isophthalate having a thickness of 50 μm (having a melting point of 170° C.) was cut into a width of 16 mm and a length of 26 mm and was placed on the face of the opening to be formed into the inner face of the final vessel. The film was pressed under a pressure of 10 Kg/cm$^2$ by a pressing member formed of a heat-resistant rubber and simultaneously, the peripheral portion of the opening was heated at 250° C. by high frequency induction heating, whereby the film was heat-bonded to the heat-bondable resin layer of the opening piece and also to the inner face coating of the can end member and an easily openable vessel closure provided with the opening piece and the protecting covering layer was prepared. When the state of the contact between the cut edge of the opening and the protecting covering layer in the easily openable vessel closure prepared in this Comparative Example was examined, it was found that the cut edge of the opening was not substantially stuck closely to the protecting covering layer, and the easily openable vessel closure obtained in this Comparative Example was apparently different from the easily openable vessel closure of the present invention obtained in Example 1 where the cut edge of the opening was closely covered with the protecting covering layer without any air space being left.

An orange juice was hot-filled in the same can body as described in Example 1 and the easily openable vessel closure was double-seamed to the can body to obtain a canned fruit juice drink.

COMPARATIVE EXAMPLE 4

In the same manner as described in Comparative Example 3, the same opening piece as described in Example 1 was fusion-bonded to the opening of the same can end member as described in Example 1 on the face to be formed into the outer face of the final vessel, and a polytetramethylene terephthalate/isophthalate powder having a melting point of 170° C. was electrostatically coated on the cut edge of the opening and on the peripheral portion of the opening on the face to be formed into the inner face of the final vessel. Then, the coated powder was fused at a temperature of 250° C. to form a protecting covering layer, whereby an easily openable vessel closure provided with the opening piece and protecting covering layer was prepared.

When the state of the contact between the cut edge of the opening and the protecting covering layer in the easily openable vessel closure of this Comparative Example was examined, it was found that a part of the protecting covering layer was not closely stuck to the cut edge of the opening, and the easily openable vessel closure of this Comparative Example was apparently different from the easily openable vessel closure of Example 1 in which the cut edge of the opening was closely covered with the protecting covering layer without any air space being left.

An orange juice was hot-filled in the same can body as described in Example 1 and the easily openable vessel closure of this Comparative Example was double-seamed to the filled can body to obtain a canned fruit juice drink.

The canned products obtained in Example 1 and Comparative Examples 1 through 4 were subjected to various tests described below. The obtained results are shown in Table 1.

Falling Test

The canned product was let to fall down on an iron plate from a height of 60 cm so that the opening piece-provided vessel closure was located below, and it was checked whether or not leakage of the content took place.

Rusting on Cut Edge of Opening

The canned product was stored in a chamber maintained at 37° C. for one year, and the opening piece was peeled and it was checked whether or not rusting was caused on the cut edge of the opening.

Dissolution of Iron during One Year's Storage

The canned product was stored in a chamber maintained at 37° C. for one year, and the amount of iron dissolved in the content during this storage was determined.

Retorting Test

The canned product was subjected to a retorting treatment at 130° C. for 1 hour, and the state of leakage of the content in the peripheral portion of the opening was examined.

double-seamed at the can body-preparing step, whereby a can end member was obtained. A maleic anhydride-modified polypropylene film (having a melting point of 160° C.) having a thickness of 50 μm was cut into a width of 20 mm and a length of 42 mm and was placed on the face of the opening to be formed into the outer face of the final vessel, and a maleic anhydride-modified polypropylene film (having a melting point of 160° C.) having a thickness of 200 μm was cut into a width of 20 mm and a length of 42 mm and placed at a position corresponding to the back face of the above-mentioned film placed on the face to be formed into the outer face of the final vessel. Then, both the films were pressed to the inner and outer faces of the can end member under a pressure of 5.3 Kg/cm$^2$ by a pressing member formed of a heat-resistant rubber, and simultaneously, the temperature of the can end member was elevated to 200° C. by high frequency induction heating, whereby both the films were heat-bonded to the can end member. Four openings having a diameter of 5 mm and being adjacent to one another were formed on the heat-bonded films by means of a punch and a die to form pouring mouths, and separately from the pouring mouths, one opening having a diameter of 5 mm was formed as an opening for taking air on flow-out of the content by means of a punch and a die.

A biaxially stretched polyethylene terephthalate film having a thickness of 50 μm was bonded through an adhesive to a soft aluminum foil having a thickness of 50 μm, and a maleic anhydride-modified polypropylene film (having a melting point of 160° C.) having a thickness of 10 μm was fusion-bonded to the other face of the aluminum foil. The so-prepared laminate film was cut into a width of 20 mm and a length of 52 mm to prepare an opening piece. The opening piece was placed on the can end member so as to cover the peripheral portions of the five openings on the outer face side with the heat-bondable resin layer of the maleic anhydride-modified polypropylene, and the assembly was pressed from

TABLE 1

| Sample | Falling Test | Rusting on Cut Edge of Opening | Amount(ppm) of Iron Dissolved during 1 Year's Storage at 37° C. | Retorting Test |
| --- | --- | --- | --- | --- |
| Example 1 | no leakage | no rusting | 0.6 | no leakage |
| Comparative Example 1 | leakage | rusting on entire surface | 124 | peeling of opening piece |
| Comparative Example 2 | leakage | rusting on entire surface | 84 | peeling of opening piece |
| Comparative Example 3 | no leakage | rusting on major portion | 25 | no peeling of opening piece but leakage observed |
| Comparative Example 4 | no leakage | partial rusting | 13 | no peeling of opening piece but leakage observed |

EXAMPLE 2

A coating having a thickness of 5 μm was formed on an aluminum alloy plate (5082-H39) having a thickness of 0.37 mm by coating and baking a mixed paint of an epoxy resin (aromatic epoxy resin derived from bisphenol A and epichlorohydrin) and a urea resin (butyl-etherified polycondensate of urea and formaldehyde).

The coated plate was formed into a vessel closure-like member having an outer diameter of 72 mm so that the coated surface was formed into the inner face of the final vessel, and an SBR type sealing compound was coated and dried on the curl portion on the peripheral edge of the vessel closure-like member, which was to be both the outer and inner face sides under a pressure of 10 Kg/cm$^2$ by a pressing member formed of a heat-resistant rubber. Simultaneously, the temperature of the peripheral portions of the openings was elevated to 250° C. by high frequency induction heating, whereby the heat-bondable resin layer of the opening piece was heat-bonded to the maleic anhydride-modified polypropylene film having a thickness of 50 μm, which was heat-bonded to the outer face sides of the peripheral portions of the openings, and this film and the maleic anhydride-modified polypropylene film having a thickness of 200 μm, which was heat-bonded to the inner face side of the peripheral portions of the openings, were thermally molded and fusion-bonded to each other to form a protecting covering layer for the cut edges of the openings, which was integrated with the film layers heat-bonded to the inner face side and outer face side peripheral portions of the openings.

A 350-ml draw-ironed can body of aluminum having an inner diameter of 65.3 mm was filled with beer and the easily openable vessel closure of the present invention prepared by the foregoing steps was double-seamed to the filled can body to obtain a canned beer drink. This canned product was maintained at 70° C. for 20 minutes to effect sterilization.

After the canned product of this Example had been stored at room temperature for 1 year, the canned product was checked. No change was observed.

EXAMPLE 3

A coating having a thickness of 5 μm was formed on one surface of an electrolytically chromic acid-treated steel plate (tin-free steel, TFS; tempering degree of T4CA) having a thickness of 0.23 mm by coating and baking a mixed paint of an epoxy resin (aromatic epoxy resin derived from a bisphenol and epichlorohydrin) and a phenolic resin (polycondensate of a phenol and an aldehyde obtained in the presence of an alkaline catalyst), and on the other surface of the steel plate, a coating having a thickness of 5 μm was formed by coating and baking a mixed paint of an epoxy resin (aromatic epoxy resin derived from a bisphenol and epichlorohydrin) and a urea resin (butyl-etherified polycondensate of urea and formaldehyde) and a top coating having a thickness of 5 μm was formed on the so-formed coating by coating and baking a paint of a vinyl chloride/vinyl acetate copolymer. The coated steel plate was formed into a vessel closure-like member having an outer diameter of 67 mm so that the surface coated with the mixed paint of the epoxy resin and phenolic resin alone was the outer surface of the final vessel, and the peripheral curl portion of the vessel closure-like member, which was to be double-seamed at the can body-forming step, was coated with an SBR type sealing compound and was then dried to form a can end member.

A drip-shaped opening having a width of 10 mm and a length of 20 mm was formed on the flat portion of the can end member by means of a punch and a die, whereby a pouring mouth was formed. A polytetramethylene terephthalate/isophthalate film having a thickness of 150 μm (having a melting point of 170° C.) was punched into a shape similar to but slightly larger than the shape of the opening formed on the steel plate, that is, a drip-like shape having a width of 14 mm and a length of 24 mm, and the punched film was placed on the opening of the steel plate on the side to be formed into the inner face of the final vessel. The above film was pressed to the peripheral portion of the opening of the can end member under a pressure of 5.3 Kg/cm² by a pressing member of brass having a top end portion having a shape similar to but slightly smaller than the opening of the film and a flat projection 0.23 mm in height, and simultaneously, the temperature of the peripheral portion of the opening of the can end member was elevated to 200° C. by high frequency induction heating, whereby the film was fusion-bonded to the can end member and the film in the vicinity of the cut edge of the opening was molten and bent so that one face of said film was substantially on the same level as that of the face of the can end member to be formed into the outer face of the final vessel (see FIG. 7-B).

Then, a polytetramethylene terephthalate/isophthalate having a thickness of 50 μm (having a melting point of 170° C.) was punched into a drip-like shape similar to but slightly larger than the shape of the opening formed on the can end member, that is, a drip-like shape having a width of 14 mm and a length of 24 mm, and the punched film was placed on the opening of the can end member on the side to be formed into the outer face of the final vessel.

Both the films were pressed under a pressure of 5.3 Kg/cm² to the peripheral portion of the opening by a pressing member formed of brass, and simultaneously, the peripheral portion of the opening was heated at 200° C. by high frequency induction heating to heat-bond both the films to the can end member.

The films heat-bonded to the inner and outer faces of the peripheral portion of the opening were perforated by means of a punch and a die so that drip-shaped openings similar to but smaller than the opening of the can end member were formed on both the films with margins having a width of 0.5 mm being left from the cut edge of the opening of the can end member.

A solution (having a solid content of about 30%) of a mixed paint comprising an epoxy resin (polycondensate of bisphenol A and epichlorohydrin having a number average molecular weight of 2800 and an epoxy equivalent of 1800) and a phenolic resin (polycondensate of phenol and formaldehyde obtained in the presence of an alkaline catalyst) at an epoxy resin/phenolic resin weight ratio of 75/25 was coated on one surface of an aluminum foil having a thickness of 50 μm, which had been subjected to a surface treatment with phosphoric acid and chromic acid, and the coating was baked at 260° C. for 45 seconds to obtain a one-surface-coated aluminum foil having a resin coating having a thickness of 5 μm (the concentration of polar groups, that is, hydroxyl, ether and epoxy groups, being 1040 millimoles per 100 g of the resin). Then, a biaxially stretched polyethylene terephthalate film having a thickness of 50 μm was bonded to the uncoated surface of the one-surface-coated aluminum foil through an adhesive, and the resulting laminate film was cut into a width of 16 mm and a length of 36 mm to prepare an opening piece. The opening piece was placed on the above-mentioned can end member so that the coated surface of the opening piece covered and heat-bondable resin layer of the polytetramethylene terephthalate/isophthalate, and the opening piece was pressed under a pressure of 10 Kg/cm² by a pressing member formed of a heat-resistant rubber. Simultaneously, the temperature of the peripheral portion of the opening was elevated to 250° C. by high frequency induction heating, whereby the coating formed on the opening piece was heat-bonded to the heat-bondable resin layer of the polytetramethylene terephthalate/isophthalate having a thickness of 50 μm, which was bonded to the outer face side periphery of the opening and the heat-bondable resin layer and film layer already bonded to both the inner and outer face side peripheral portions of the opening and projected inwardly of the cut edge of the opening along a width of 0.5 mm were fusion-bonded to each other to form a projecting covering for the cut edge of the opening.

The easily openable vessel closure according to the present invention was prepared by the foregoing steps. An orange juice was hot-filled in a bonded can body for a 250-gram can, which had an inner diameter of 52.3 mm and was formed of a TFS plate having a thickness of 0.22 mm and to the other end of which an ordinary vessel closure was double-seamed, and the easily openable vessel closure of this Example was double-seamed to one end of the filled can body to obtain a canned fruit juice drink.

When the opening piece was peeled from the can end member, a feather-like heat-bondable resin layer was not left on the opening of the can end member but a beautiful piercing opening was obtained on the can end member.

EXAMPLE 4

A coating having a thickness of 5 μm was formed on each surface of an electrolytically chromic acid-treated steel plate (tin-free steel, TFS; tempering degree of T4CA) having a thickness of 0.23 mm by coating and baking a mixed paint of an epoxy resin (aromatic epoxy resin derived from a bisphenol and an epihalohydrin) and a phenolic resin (polycondensate of a phenol and an aldehyde obtained in the presence of an alkaline catalyst).

The coated steel plate was formed into a vessel closure-like member having an outer diameter of 67 mm and the peripheral curl portion of the vessel closure-like member, which was to be double-seamed at the can body-forming step, was coated with an SBR type sealing compound and was then dried to form a can end member.

A circular opening having a diameter of 15 mm was formed on the flat portion of the can end member by means of a punch and a die, whereby a pouring mouth was formed. Separately from this pouring mouth, a circular opening having a diameter of 5 mm was formed as an opening for taking air on flow-out of the content by means of a punch and a die. A film having a thickness of 50 μm, which was composed of a blend comprising polyethylene terephthalate/isophthalate (having a melting point of 200° C.) and polytetramethylene terephthalate/isophthalate (having a melting point of 200° C.) at a weight ratio of 50/50, was cut into a width of 20 mm and a length of 37 mm and was placed on the face of the opening to be formed into the outer face of the final vessel. Moreover, a polytetramethylene terephthalate/isophthalate film (having a melting point of 160° C.) having a thickness of 100 μm was cut into a width of 20 mm and a length of 37 mm and placed on the face of the opening to be formed into the inner face of the final vessel.

Then, both the films were pressed to the peripheral portion of the opening under a pressure of 5.3 Kg/cm² by a pressing member formed of brass, and simultaneously, the temperature of the peripheral portion of the opening was elevated to 250° C. by high frequency induction heating to fusion-bond the films to the can end member. Holes smaller than the above openings having diameters 15 mm and 5 mm were formed on each film with margins having a width of 1 mm being left from the cut edges of the openings by means of a punch and a die.

One surface of an aluminum foil having a thickness of 50 μm was coated with a vinyl chloride organosol paint having a solid content of 40% [comprising vinyl chloride, a vinyl chloride/vinyl acetate/maleic acid copolymer (copolymerization ratio=86/13/1), an epoxy resin (aromatic epoxy resin derived from bisphenol A and epichlorohydrin and having a number average molecular weight of 2800 and an epoxy equivalent of 1800) and a phenolic resin (polycondensate of phenol and formaldehyde obtained in the presence of an alkaline catalyst) at a weight ratio of 50/40/5/5], and the coating was baked at 230° C. for 30 seconds to form a baked coating having a thickness of 4 [m (containing polar groups, that is, carboxylic acid ester, hydroxyl, ether and epoxy groups, at a concentration of 80 millimoles per 100 g of the resin). A biaxially stretched polyethylene terephthalate film having a thickness of 50 μm was bonded through an adhesive to the uncoated surface of the one-surface-coated aluminum foil, and the resulting laminate film was cut into a width of 20 mm and a length of 46 mm to form an opening piece. The opening piece was placed on the can end member so that the coated surface of the opening piece covered the heat-bondable resin layer composed of the blend of polyethylene terephthalate/isophthalate and polytetramethylene terephthalate and isophthalate. Then, the opening piece was pressed to the can end member under a pressure of 10 Kg/cm² by a pressing member formed of a heat-resistant rubber and simultaneously, the temperature of the peripheral portion of the opening was elevated to 250° C., whereby the coating formed on the opening piece was fusion-bonded to the heat-bondable resin layer of the blend of polyethylene terephthalate/isophthalate and polytetramethylene terephthalate/isophthalate, which had a thickness of 50 μm and was heat-bonded to the outer face side peripheral portion of the opening and the heat-bondable resin layer and film projecting along a width of 1 mm inwardly of the cut edge of the opening, which were bonded to the inner and outer face side peripheral portions of the opening, were fusion-bonded to each other to form a projection covering for the cut edge of the opening.

The easily openable vessel closure according to the present invention was prepared by the foregoing steps. A vegetable juice was hot-filled in a bonded can body for a 250-gram can, which had an inner diameter of 52.3 mm and was formed of a TFS plate having a thickness of 0.22 mm and to the other end of which an ordinary vessel closure was double-seamed, and the easily openable vessel closure of this Example was double-seamed to one end of the filled can body to obtain a canned vegetable juice drink.

When the opening piece was peeled from the can end member, a feather-like heat-bondable resin layer was not left on the opening of the can end member but a beautiful piercing opening was obtained on the can end member.

EXAMPLE 5

A tinplate sheet (tempering degree of T-4 and deposited tin amount of 11.2 g/m²) having a thickness of 0.23 mm was coated on both the surfaces with a mixed paint of an epoxy resin (polycondensate of bisphenol A and epichlorohydrin) and a urea resin (butyl-etherified polycondensate of urea and formaldehyde), and the coating was baked to form a baked coating having a thickness of 5 μm. The coated tinplate sheet was formed into a vessel closure-like member having an outer diameter of 67 mm, and the curl portion to be double-seamed at the step of manufacturing a can body was coated with an SBR type sealing compound, and the sealing compound was dried, whereby a can end member was prepared.

A poly-ω-aminododecanoic acid film (having a melting point of 175° C.) having a thickness of 80 μm was cut into a width of 18 mm and a length of 37 mm and was placed on the face of the opening to be formed into the outer face of the final vessel. Then, the film was pressed to the peripheral portion of the opening under a pressure of 5.3 Kg/cm$^2$ by a pressing member formed of brass, and simultaneously, the temperature of the can end member was elevated to 220° C. by high frequency induction heating and the film was heat-bonded to the can end member. A circular opening having a diameter of 12 mm was formed on the film as a pouring mouth by means of a punch and a die, and separately from this opening, a circular opening having a diameter of 5 mm was formed as an opening for taking air on flow-out of the content by means of a punch and a die. A poly-ω-aminododecanoic acid film (having a melting point of 175° C.) having a thickness of 150 μm, on which openings having diameters of 11 mm and 4 mm, respectively, were formed so that the distance between the centers of the two openings was equal to the distance between the centers of the above-mentioned openings, was cut into a width of 18 mm and a length of 37 mm, and the film was pressed to the inner face side peripheral portion of the opening of the can end member under a pressure of 5.3 Kg/cm$^2$ by means of a punch and a die so that a margin of the film projected along a width of 0.5 mm from the cut edge of the opening of the can end member. Simultaneously, the temperature of the can end member was elevated to 220° C. by high frequency induction heating to heat-bond the film to the can end member.

Both the surfaces of an iron foil having a thickness of 20 μm, which had been subjected to an electrolytic surface treatment with chromic acid, were coated with a solution (having a solid content of about 30%) of a mixed resin comprising an epoxy resin (polycondensate of bisphenol A and epichlorohydrin having a number average molecular weight of 3700 and an epoxy equivalent of 2500) and a urea resin (butyl-etherified polycondensate of urea and formaldehyde) at a weight ratio of 80/20, and the coating was baked at 230° C. for 30 seconds to form a coating having a thickness of 5 μm (containing polar groups, that is, hydroxyl, ether and epoxy groups, at a concentration of 1330 millimoles per 100 g of the resin). The resulting laminate film was cut into a width of 18 mm and a length of 46 mm to form an opening piece.

The opening piece was placed on the can end member so that the heat-bondable resin layer of the poly-ω-aminododecanoic acid was covered by the opening piece, and the opening piece was pressed to the can end member under a pressure of 10 Kg/cm$^2$ by a pressing member formed of brass. Simultaneously, the temperature of the peripheral portion of the opening was elevated to 220° C. by high frequency induction heating, whereby the coating formed on the opening piece was heat-bonded to the poly-ω-aminododecanoic acid film having a thickness of 80 μm, which was heat-bonded to the outer face side peripheral portion of the opening, and this film and the film having a thickness of 150 μm, which was heat-bonded to the inner face side peripheral portion of the opening, were thermally molded and fusion-bonded, whereby a protecting covering for the cut edge, which was integrated with the film layers heat-bonded to the inner and outer face side peripheral portions of the openings, was formed.

The easily openable vessel closure according to the present invention was prepared by the foregoing steps. A coffee drink was hot-filled in a bonded can body for a 200-gram can, which had an inner diameter of 52.3 mm and was formed of a TFS plate having a thickness of 0.22 mm and to the other end of which an ordinary vessel closure was double-seamed, and the easily openable vessel closure of this Example was double-seamed to one end of the filled can body to obtain a canned coffee drink. Then, the packed can was retorted at 125° C. for 20 minutes.

When the so-obtained canned product was stored at room temperature for 2 years, no change was observed.

EXAMPLE 6

A coating having a thickness of 5 μm was formed on one surface of an electrolytically chromic acid-treated steel plate (tin-free steel, TFS; tempering degree of T4CA) having a thickness of 0.23 mm by coating and baking a mixed paint of an epoxy resin (aromatic epoxy resin derived from a bisphenol and epichlorohydrin) and a phenolic resin (polycondensate of a phenol and an aldehyde obtained in the presence of an alkaline catalyst), and on the other surface of the steel plate, a coating having a thickness of 5 μm was formed by coating and baking a mixed paint of an epoxy resin (aromatic epoxy resin derived from a bisphenol and epichlorohydrin) and a urea resin (butyl-etherified polycondensate of urea and formaldehyde) and a top coating having a thickness of 5 μm was formed on the so-formed coating by coating and baking a paint of a vinyl chloride/vinyl acetate copolymer. The coated steel plate was formed into a vessel closure-like member having an outer diameter of 67 mm so that the surface coated with the mixed paint of the epoxy resin and phenolic resin alone was the outer surface of the final vessel, and the peripheral curl portion of the vessel closure-like member, which was to be double-seamed at the can body-forming step, was coated with an SBR type sealing compound and was then dried to form a can end member.

A drip-shaped opening having a width of 10 mm and a length of 20 mm was formed on the flat portion of the can end member by means of a punch and a die, whereby a pouring mouth was formed. A polytetramethylene terephthalate/isophthalate film having a thickness of 150 μm (having a melting point of 170° C.) was cut into a length of 16 mm and a width of 26 mm and placed on opening of the steel plate on the side to be formed into the inner face of the final vessel. A polytetramethylene terephthalate/isophthalate having a thickness of 50 μm (having a melting point of 170°) was cut into a length of 16 mm and a length of 26 mm and placed on the face of the opening to be formed into the outer face of the final vessel. Then, both the films were pressed to the peripheral portion of the opening under a pressure of 5.3 Kg/cm$^2$ by a pressing member formed of brass, and simultaneously, the temperature of the peripheral portion of the opening was elevated to 200° C., whereby both the films were fusion-bonded to the can end member.

Openings having a drip-like shape similar to but smaller than the shape of the opening of the can end member were formed on the films heat-bonded to the inner and outer faces of the peripheral portion of the opening of the can end member by means of a punch and a die so that margins of the films having a width of 0.5 mm were projected inwardly from the cut edge of the opening of the can end member.

One surface of an aluminum foil having a thickness of 50 μm, which had been subjected to a surface treatment with phosphoric acid and chromic acid, was coated with a solution (having a solid content of about 35%) of a mixed resin comprising an epoxy resin (polycondensate of bisphenol A and epichlorohydrin having a number average molecular weight of 2800 and an epoxy equivalent of 1800) and a phenolic resin (polycondensate of phenol and formaldehyde obtained in the presence of an alkaline catalyst) at a weight ratio of 80/20, and the coated solution was baked at 260° C. for 40 seconds to form a coating having a thickness of 4 $\mu$m (containing polar groups, that is, hydroxyl, ether and epoxy groups, at a concentration of 1040 millimoles per 100 g of the resin). A polytetramethylene terephthalate/isophthalate film (having a melting point of 170° C.) having a thickness of 10 $\mu$m was heat-bonded at 180° C. to the coated surface of the one-surface-coated aluminum foil. Then, a biaxially stretched polyethylene terephthalate film having a thickness of 50 $\mu$m was bonded through an adhesive to the uncoated surface of the aluminum foil. The so-formed laminate film was cut into a width of 16 mm and a length of 36 mm to form an opening piece.

The opening piece was placed on the can end member so that the heat-bondable resin layer of the polytetramethylene terephthalate/isophthalate was covered with the polytetramethylene terephthalate/isophthalate film of the opening piece, and the opening piece was pressed under a pressure of 10 Kg/cm$^2$ by a pressing member formed of a heat-resistant rubber. Simultaneously, the peripheral portion of the opening was heated at 250° C. by high frequency induction heating, whereby the polytetramethylene terephthalate/isophthalate film of the opening piece was heat-bonded to the polytetramethylene terephthalate/isophthalate film having a thickness of 50 $\mu$m, which was heat-bonded to the peripheral portion of the opening to be formed into the outer face of the final vessel, and the polytetramethylene terephthalate/isophthalate films, which were bonded to the inner and outer faces of the peripheral portion of the opening and projected along a width of 0.5 mm inwardly from the cut edge of the opening, were fusion-bonded to each other to form a protecting covering layer for the cut edge of the opening.

The easily openable vessel closure according to the present invention was prepared by the foregoing steps. An orange juice was hot-filled in a bonded can body for a 250-gram can, which had an inner diameter of 52.3 mm and was formed of a TFS plate having a thickness of 0.22 mm and to the other end of which an ordinary vessel closure was double seamed, and the easily openable vessel closure of this Example was double-seamed to one end of the filled can body to obtain a canned fruit juice drink.

When the opening piece was peeled from the can end member, a feather-like heat-bondable resin layer was not left on the opening of the can end member but a beautiful piercing opening was obtained on the can end member.

What is claimed is:

1. An easily openable vessel closure comprising a can end member having a preformed opening, an easily peelable opening piece which is applied to the outer side of the can end member so that the opening piece covers said opening and adheres closely to the peripheral portion of said opening, and a protecting covering layer formed to cover the cut edge of the opening of the can end member, wherein the protecting covering layer is formed of a thermoplastic resin having a heat bondability and the protecting covering layer includes film layers heat-bonded to the inner and outer peripheral portions of the opennning and a projecting cover heat-bonded to the cut edge of the opening integrally with said film layers, and said opening piece is heat-bonded to the can end member through the protecting covering layer located outside the can end member and said protecting covering layer is stuck closely to the cut edge of the opening so that when the opening piece is peeled, the protecting covering layer is left on the side of the can end member.

2. A vessel closure as set forth in claim 1, wherein the projecting cover is formed by pushing the end portion of the film on the side of the opening into the cut edge of the opening.

3. A vessel closure as set forth in claim 1, wherein said opening piece comprises a substrate and a resin coating and/or heat-bondable resin layer formed on the substrate on the side confronting the can end member, and heat sealing is effected between the heat-bondable resin layers or between the heat-bondable resin layer and the resin coating.

4. A vessel closure as set forth in claim 1, wherein the resin coating of the opening piece is formed of a resin or resin composition containing polar groups selected from the group consisting of carboxylic acid, carboxylic acid ester, carboxylic acid amide, hydroxyl, ether and epoxy groups at a concentration of 10 to 2000 millimoles per 100 g of the resin.

5. A vessel closure as set forth in claim 1 or 3, wherein the thermoplastic resin layer is formed of a thermoplastic resin having a melting or softening point of 70° to 260° C.

6. A vessel closure as set forth in claim 1 or 3, wherein the thermoplastic resin layer is composed mainly of a polyester resin.

7. A vessel closure as set forth in claim 3, wherein the substrate is a metal foil substrate which is subjected to a surface treatment selected from a treatment with phosphoric acid and/or chromic acid, an electrolytic chromic acid treatment, a boehmite treatment, an alumite treatment, an organic titanium treatment and an organic zirconium treatment.

8. A vessel closure as set forth in claim 1, wherein the film layer heat-bonded to the outer face side peripheral portion of the opening has an outer contour similar to but slightly larger than the shape of the opening of the can end member.

9. A process for the preparation of easily openable vessel closures, which comprises in combination the steps of forming a laminate comprising a can end member and thermoplastic resin film layers heat-bonded to the inner and outer faces of the can end member, each film layer having an opening corresponding to an opening of the can end member, pushing the end portions of the thermoplastic resin layers in the molten state into the cut edge of the opening of the cut end member to form a projecting cover heat-bonded to the cut edge of the opening, and applying an opening piece on the outer face of the can end member to cover the opening of the can end member and heat-bonding the opening piece to the peripheral portion of said opening through said thermoplastic resin film layers.

10. A process for the preparation of easily openable vessel closures, which comprises in combination the steps of forming a laminate comprising a can end member and thermoplastic resin film layers heat-bonded to the inner and outer faces of the can end member, each of the inner and outer film layers having an opening corresponding to an opening formed on the can end member and the end portion of the one film layer being bent along the cut edge of the opening of the can end member, heat-bonding the bent portion of the film layer to the cut edge of the opening of the can end member and simultaneously integrating the end portions of both the film layers with each other by fusion bonding, and applying an opening piece to the outer face of the can end member to cover the opening of the can end member and heat-bonding the opening piece to the periphery of the opening of the can end member through said thermoplastic resin film layer.

* * * * *